United States Patent [19]

Lowry et al.

[11] Patent Number: 5,310,053
[45] Date of Patent: May 10, 1994

[54] TELESCOPING COMPACT DISC HOLDER AND FOLDABLE COVER

[75] Inventors: Alan Lowry, Caton, Mass.; Robert Steller, Old Orchard Beach, Me.; William F. Fitzsimmons, Kennebunkport, Me.; Craig Lovecky, Old Orchard Beach, Me.

[73] Assignee: Shape Inc., Biddeford, Me.

[21] Appl. No.: 854,687

[22] Filed: Mar. 20, 1992

[51] Int. Cl.$^5$ .................................. B65D 85/57
[52] U.S. Cl. .................................. 206/310; 206/313; 206/444; 229/9; 229/19
[58] Field of Search .................. 206/307, 307-313, 206/444, 387; 220/662, 345, 347; 229/9, 19

[56] References Cited

U.S. PATENT DOCUMENTS

| | | |
|---|---|---|
| 1,502,312 | 7/1924 | Mayhew . |
| 3,116,005 | 12/1963 | Skaggs . |
| 3,556,391 | 1/1971 | Kosterka . |
| 4,076,117 | 2/1978 | Wisdom et al. .......... 220/347 X |
| 4,159,827 | 7/1979 | Torrington ............... 206/313 X |
| 4,176,744 | 12/1979 | Borzak . |
| 4,327,831 | 5/1982 | Inaba et al. . |
| 4,478,335 | 10/1984 | Long et al. . |
| 4,511,034 | 4/1985 | Pan . |
| 4,519,500 | 5/1985 | Perchak . |
| 4,535,888 | 8/1985 | Nusselder . |
| 4,557,383 | 12/1985 | Arnoux et al. .......... 220/662 X |
| 4,635,792 | 1/1987 | Yamada et al. . |
| 4,702,369 | 10/1987 | Philosophe . |
| 4,709,812 | 12/1987 | Kosterka . |
| 4,771,883 | 9/1988 | Herr et al. . |
| 4,874,085 | 10/1989 | Grobecker et al. . |
| 4,881,640 | 11/1989 | Herr et al. .................. 206/313 |
| 4,899,875 | 2/1990 | Herr et al. .................. 206/313 |
| 4,925,023 | 5/1990 | Goldblatt et al. . |
| 5,000,316 | 3/1991 | Lerner ........................ 206/309 |
| 5,011,010 | 4/1991 | Francis et al. ............. 206/307 |
| 5,054,616 | 10/1991 | Gelardi et al. ........... 220/662 X |

FOREIGN PATENT DOCUMENTS

| | | |
|---|---|---|
| 1198208 | 12/1985 | Canada . |
| 130266 | 1/1985 | European Pat. Off. . |
| 221749 | 5/1987 | European Pat. Off. . |
| 3414903 | 10/1985 | Fed. Rep. of Germany . |
| 3425579 | 1/1986 | Fed. Rep. of Germany . |
| 1050913 | 1/1954 | France . |
| 85/01033 | 3/1985 | PCT Int'l Appl. . |
| 86/07182 | 12/1986 | PCT Int'l Appl. . |
| 2091219 | 7/1982 | United Kingdom . |
| 2135274 | 8/1984 | United Kingdom . |
| 2147262 | 5/1985 | United Kingdom . |

OTHER PUBLICATIONS

"Music Firms Try Out 'Green' CD Boxes", Meg Cox, *The Wall Street Journal*, Jul. 25, 1991.
"CD Packaging Dilemna Spills Over to Arm Meet", Ken Terry, *Billboard*, Mar. 30, 1991, pp. 5 and 131.
"Smaller CD Boxes Promised Amid Clamor About Waste", Sheila Rule, *New York Times*, Feb. 28, 1992, pp. A-1, D5.
"CD Marketers Will Eliminate Paper Packaging"; Meg Cox, *The Wall Street Journal*, Feb. 28, 1992, pp. B1, B2.

*Primary Examiner*—Bryon P. Gehman
*Attorney, Agent, or Firm*—Staas & Halsey

[57] ABSTRACT

A CD package including a CD holder and a foldable cover for the holder. The CD holder includes a tray and base in telescoping relationship, one of the tray and base being glued to the foldable cover. The CD holder includes edge projections and recesses which cooperate with edge projections and recesses of other CD holders to allow stacking of the CD holders to facilitate automated assembly. The base and tray also include ramped stops and cooperating projections, respectively, inward of the sides, to releasably lock the tray and base in the telescoped and untelescoped positions. Tabs are provided on the sides of the base to abut the tray and improve stability of the base relative to the tray in the untelescoped configuration. A transparent window is assembled on an end cap via a tongue and groove connection and then welded. Detents are added adjacent a recess formed on each side wall of the end cap, which recesses cooperate with a projection on the tray to connect the cap and tray. The detents reduce friction between the end cap and tray to ease opening of the cap. Finally, the base and end cap include a waffle-like texture to improve adhesion of these members to the foldable cover by glue.

13 Claims, 11 Drawing Sheets

TELESCOPING COMPACT DISC HOLDER AND FOLDABLE COVER

BACKGROUND OF THE INVENTION

This invention relates to storage devices for magnetic media and, more particularly, to a compact disc (CD) package, including a telescoping CD holder and foldable cover for the holder, which serves to deter theft at the retail level and protectively stores the CD when not in use.

Since the currently popular music CD's are susceptible to scratching, smudging and other signal eroding damage, they are preferably protected in a storage device when not being used in a CD player. The predominantly used storage device for the CD is the "jewel box" which includes clear front and back panels and an opaque compact disc holder which snap-fits into the back package panel. The front and back panels of the jewel box are normally hingedly connected along one edge to pivot open like a book.

Conventionally, the closed jewel box, with CD inside, has been placed in a pre-formed cardboard "long box" or "tuck box" (about 6×12 inches), to maximize graphics and prevent theft at the retail level. Once purchased, the long box is discarded and the jewel box only is used for storing the CD when not in use.

This conventional CD package, including the jewel box and cardboard long box, has been criticized by environmental groups because of its use of a non-biodegradable material (i.e., plastic) in great quantities due to the sheer volume of CD's being sold, and of a valuable resource (i.e., cardboard/paperboard) in great quantities due to the oversized nature of the packaging relative to the jewel box. See *Wall Street Journal*, Jul. 25, 1991, page 31, "Music Firms Try Out 'Green' CD Boxes"; *New York Times*, Feb. 28, 1992, Front Page and page D5, "Smaller CD Boxes Promised Amid Clamor About Waste"; and *Wall Street Journal*, Feb. 28, 1992, pages B-1, B-2, "CD Marketers Will Eliminate Paper Packaging."

There have been attempts to modify this conventional CD packaging. One example is described in U.S. Pat. No. 4,709,812, wherein, in an unassembled state, a rectangular paperboard sheet is divided into two rows of three sections, each section with foldlines therebetween. During assembly, the sections of the first row are folded over along a central, longitudinal fold line on top of the second row and glued down. After the folding operation is completed, a one-piece CD holder is glued to an end section. The remaining sections are folded over the CD holder. Finally, the folded package is inserted into a cardboard long box and shrink wrapped. Although plastic consumption is reduced, since the jewel box front plastic panel is eliminated, more cardboard is used, since both the retained foldable cardboard cover and the disposable long box are still used.

In a joint venture between the Assignee herein and Ivy Hill Records (hereinafter "Ivy Hill"), a CD package was developed which seeks to improve upon the package described in the above-cited U.S. Pat. No. 4,709,812. It is believed Ivy Hill has filed a U.S. patent application for this CD package.

The Ivy Hill CD package uses a CD holder including tray adapted to releasably receive the CD, and a base in telescopic relationship with the tray. Either the tray or the base is glued to a section of a foldable cardboard cover. A plastic end cap is glued to one end of the cover to connect to the holder. The holder is convertible from a retail configuration, wherein the base and tray are slid apart, with the cardboard cover extending therearound to form a long box, to a storage configuration, wherein the base and tray are slid together, one substantially inside the other, with the cardboard cover folded therearound and the end cap engaged.

In this CD package, biased side locks protrude from rails on the sides of the base and engage apertures formed in the sides of the tray to lock the base and tray in the telescoped and non-telescoped positions, respectively. By making the side locks a part of the rails upon which the base slides relative to the tray, the base has a tendency to be unstable or wobble, and the base could camber in the slid-apart position. Moreover, releasing the side locks is sometimes difficult Also, the trays and caps of this design are not capable of nesting, which frustrates automated assembly, shipping and storage.

Further, although this design uses a transparent window on the cap, the window is merely co-injection molded into the end cap. This requires a special mold having careful tolerances.

Moreover, where it is desired to remove the cap from engagement with the tray, the user places a thumb and middle finger on the side walls of the cap. Unfortunately, this causes the side walls to press against the sides of the tray, which creates friction or binding which makes opening the cap harder.

Finally, the glue for affixing the CD holder to the cover escapes from between the planar surfaces of the CD holder and cap when pressed together, causing an unsightly package.

The present invention is an improvement upon the Ivy Hill CD package.

SUMMARY OF THE INVENTION

It is a purpose of the present invention to facilitate automation of CD packages by providing CD holders which nest or stack together.

It is another purpose of the present invention to facilitate automation by providing an end cap window which is easily received in the end cap and welded. It is another purpose of the present invention to provide an end cap which is easier to connect to and disconnect from the CD holder.

It is another purpose of the present invention to provide a CD holder having a more effective means for locking the tray and base in the telescoped and untelescoped positions.

It is another purpose of the present invention to provide a CD package which is simple and inexpensive to manufacture and yet shares the benefits of the popular jewel box.

Finally, it is a purpose of the present invention to provide a CD package which the consumer can easily transform from the retail to the storage configurations.

To achieve the foregoing and other purposes of the present invention there is provided a CD package including a CD holder 15 and a foldable cover for the holder. The CD holder includes a tray and base in telescoping relationship, one of the tray and base being glued to the foldable cover. The CD holder includes edge projections and recesses which cooperate with edge projections and recesses of other CD holders to allow stacking of the CD holders to facilitate automated assembly. The base and tray also include ramped stops and cooperating projections, respectively, inward of the sides, to releasably lock the tray and base in the telescoped and untelescoped positions. Tabs are provided on the sides of the base to abut the tray and improve stability of the base relative to the tray in the untelescoped configuration. A transparent window is assembled on an end cap via a tongue and groove connection and then welded. Detents are added adjacent a recess formed on each side wall of the end cap, which recesses cooperate with projections formed on the tray side walls to connect the cap and tray. The detents reduce friction between the end cap and tray to ease opening of the end cap. Finally, the base and end cap include a waffle like texture to prevent leakage of glue from between the cap and the foldable cover, and between the tray/base and the foldable cover.

Other features and advantages of the present invention will be apparent from the following description taken in conjunction with the accompanying drawings, in which like reference characters designate the same o similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
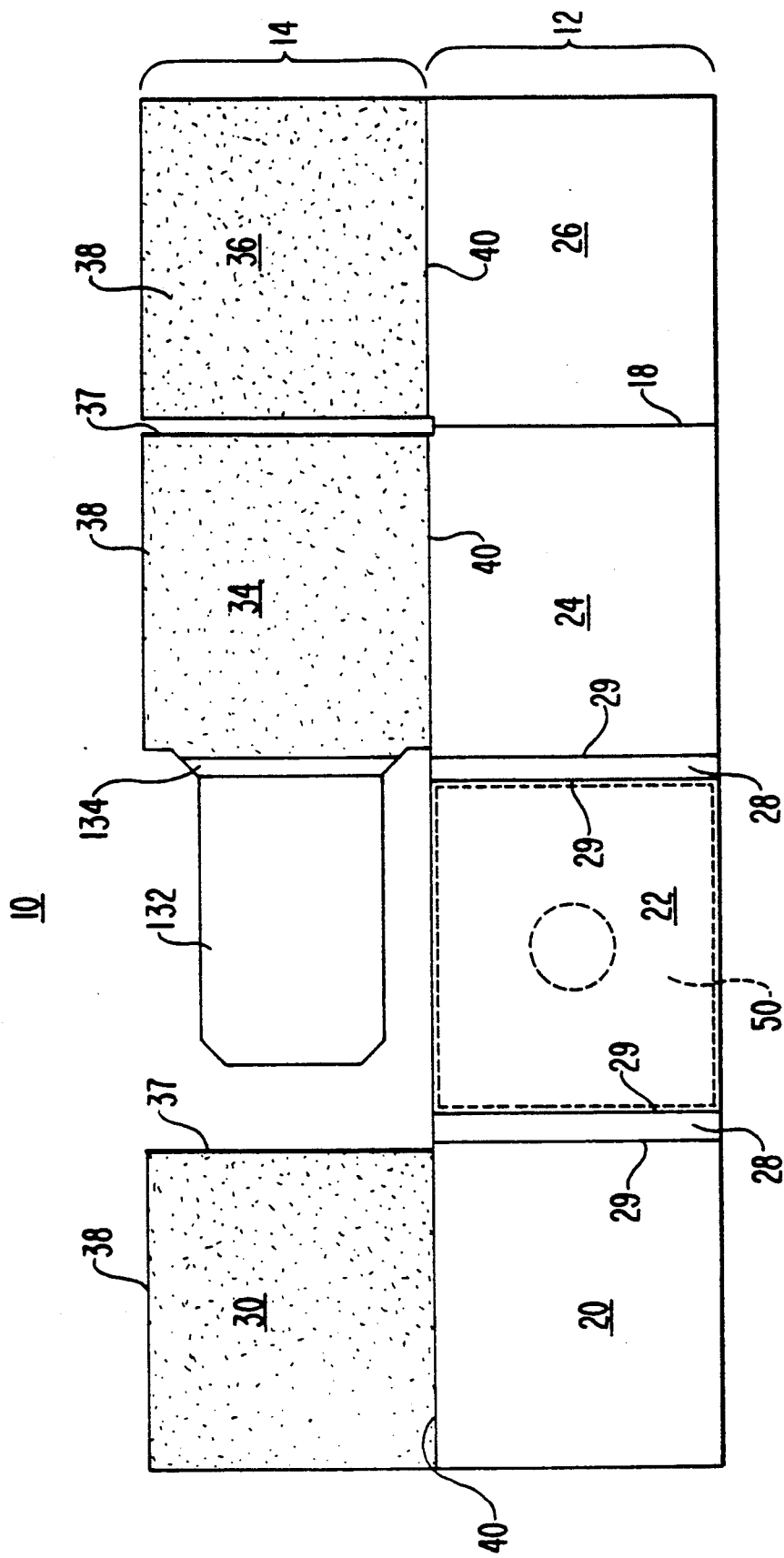
FIG. 1 is a top plan view of a cardboard blank from which the foldable cover of the CD package of the present invention is formed.

Referring now to the drawings, FIG. 1 illustrates a blank 10 for use in the present invention. The blank 10 in its unfolded state includes a rectangular sheet of paperboard, cardboard or the like divided into a plurality of rows, including a first row generally designated 12, and a second row generally designated 14 to one side of the first row 12 (illustrated in FIG. 1 as above the first row 12).

The first row 12 is preferably divided into a plurality of four generally rectangular sections 20, 22, 24, 26, separated from each other laterally either by a transverse foldline 18 (between sections 24, 26) or by relatively thin strips 28, each strip 28 in turn being bounded laterally by transverse foldlines 29 (between sections 20, 22 and 22, 24). The total number (here, 3) of foldlines 18 (here, 1) and strips 28 (here, 2) is one less than the number of sections (here, 4) in the first row 12.

The second row 14 preferably contains a fewer number of generally rectangular sections than the first row 12, three sections 30, 34 and 36 being illustrated. The sections of the second row 14 are separated from each other by slots 37 (between sections 30, and 34 and 36) having a width which is at least slightly greater than the width of the foldline 18 or strips 28 aligned therewith. In the case of non-consecutive sections in the second row 14, the slot 37 (between sections 30, 34), is greater than the width of a single section 20, 22, 24, 26 of the first row 12 and any of the bordering foldline 18 or strips 28.

The second row also includes a cut back panel 132 connected to the panel 34 by a portion 134. The cut back panel 132 is folded on to the panel 22 and glued thereto.

The sections 30, 34, 36 of the second row 14 are separated from the aligned sections 20, 24, 26 of the first row 12 by a longitudinal foldline 40 so that at least one of the sections 30, 34, 36 of the second row 14 may be folded along the foldline 40 so that each of the thus-folded sections 30, 34, 36 of the second row 14 partially overlies a respective section 20, 24, 26 of the first row 12, but does not overlie any foldline 18 or strips 28 adjacent that section of the first row 12.

Because the slots 37 are wider than the foldline 18 or strips 28, when the sections of the second row 14 are folded over the sections of the first row 12, the slots 37 do not extend across the adjacent foldline 18 or the adjacent strips 28 (including foldlines 29).

After sections 30, 34, 36 of the second row 14 are folded over along foldline 40 on top of aligned sections 20, 24, 26 of the first row 12, they are glued down to the latter sections to form segments defined by one section of the first row 12 and one section of the second row 14, by adhesive means 38 indicated in FIG. 1.

After, during or before the aforementioned folding and gluing operation, a CD holder according to the present invention, generally designated 50, is glued or otherwise affixed to the face of one of the sections 20, 22, 24, 26 of the first row 12 which will not be overlaid by and glued to one of the sections 30, 34, 36 of the second row 14. Thus, the CD holder 50 (shown in phantom lines) is glued to section 22 in the embodiment illustrated in FIG. 1.

Figure 2:
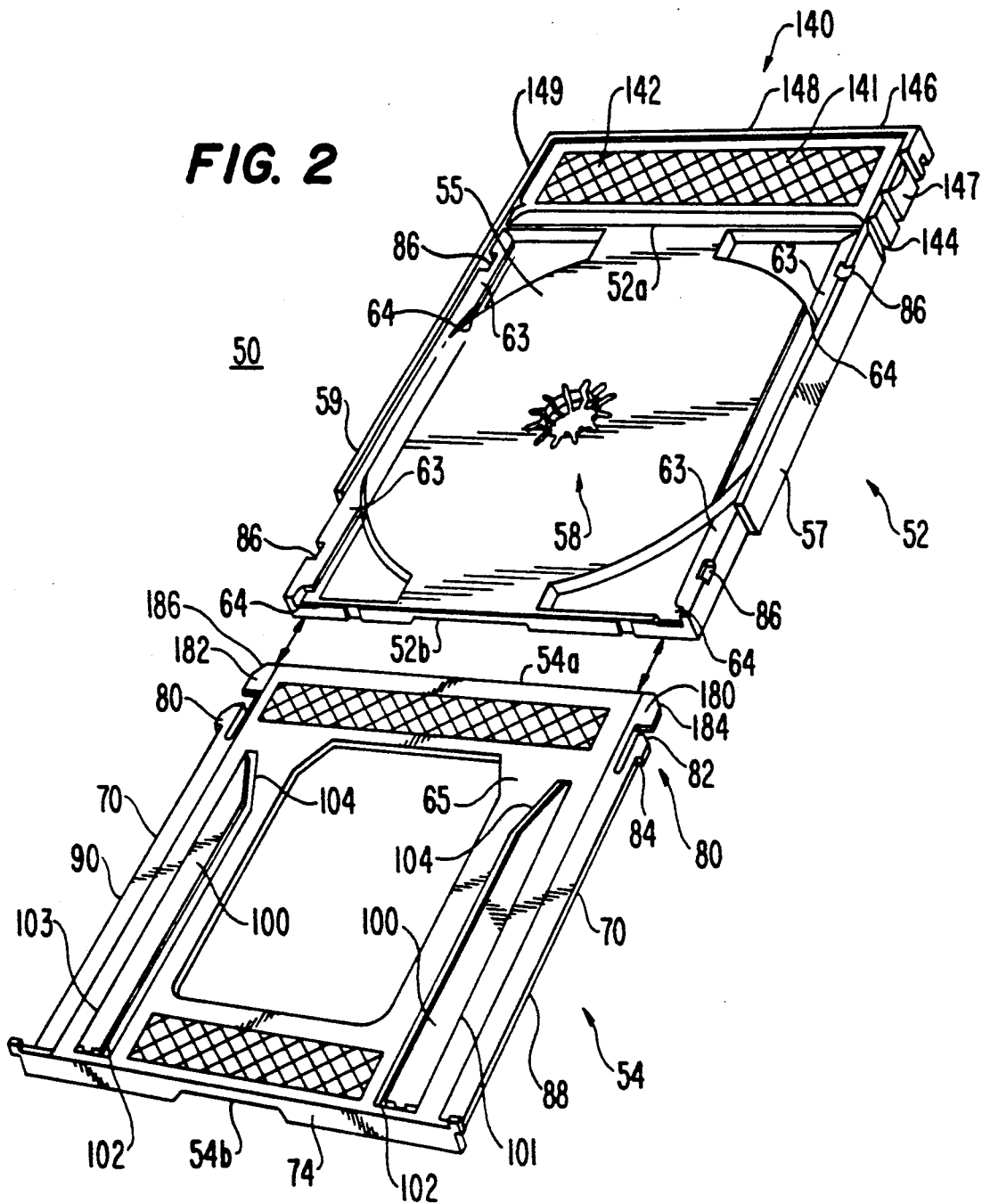
FIG. 2 is a perspective view of the bottom of the CD holder according to a first embodiment of the present invention.
Figure 3:
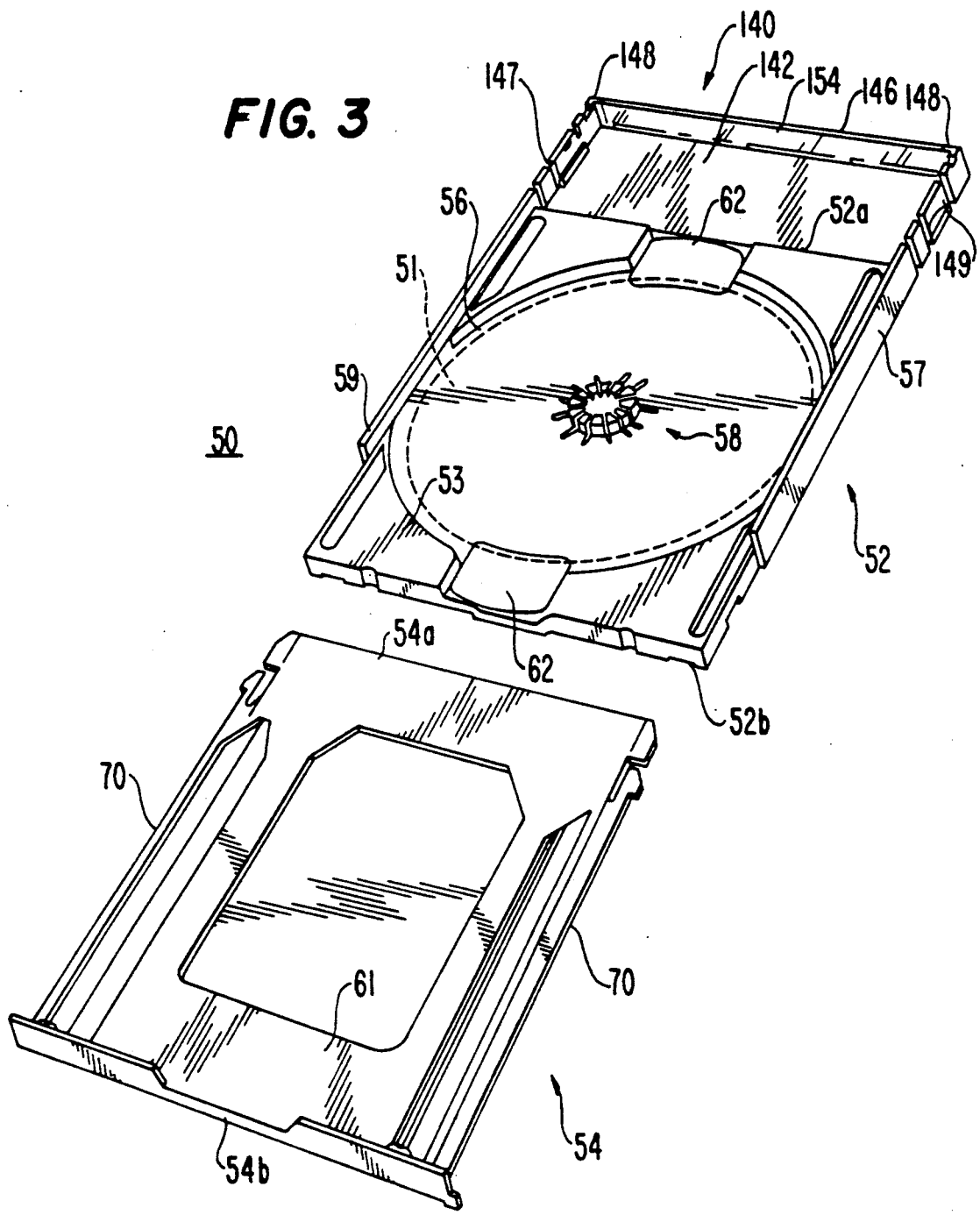
FIG. 3 is a perspective view of the top of the CD holder according to the first embodiment of the present invention.

FIGS. 2 and 3 illustrate the first embodiment of the CD holder 50. CD holder 50 includes a generally planar tray designated 52 adapted to releasably receive a CD 51. The tray 52 is approximately 4.9 inches long by 5.5 inches wide for a standard CD (approximately 4.7 inches in outer diameter). The CD holder 50 also includes a generally planar base 54 received by the tray 52.

More particularly, the tray 52 and base 54 are disposed in a mutually slidable, telescoping relationship permitting switching between a telescoped, unspanned configuration, wherein the base and the tray are substantially overlying, and an untelescoped spanning configuration, as described more fully below.

A front face 53 of tray 52 (shown in FIG. 3) is similar to the front face of a conventional CD holder. The front face 53 defines a recess 56 which is adapted to receive therewithin the CD 51, with the upper surface of the CD preferably flush with or below the upper-most surface of the tray 52 to protect the CD. The circumference of the recess 56 is slightly greater than the circumference of the CD to facilitate receipt of the CD within the recess 56.

An upstanding element 58 in the center of the recess 56 extends through a central hole in the CD (approximately 0.6 inches in diameter) and provides a means for releasably retaining the CD 51 on the tray 52 against accidental displacement. Any of the conventional means for providing frictional engagement between element 58 and the circumference of the central hole of the CD can be used.

The front face 53 of the tray 52 is also provided with one or more finger slots 62 (two diametrically opposed finger slots being illustrated) so that the user can slide a finger under the edge of the CD while simultaneously exerting a slightly inward and downward force with his thumb on the element 58, thus permitting the user to easily disengage the CD from element 58.

The tray 52 has an opposed pair of sides 57, 59 defining at least a pair of inwardly extending flanges 63 defining slideways or slots 64 disposed along the length of the tray 52 and adapted to receive thin slides or rails 70 provided on the base 54, as described hereinafter.

The tray 52 and base 54 are preferably formed exclusively of plastic, especially a rigid or semi-rigid plastic such as high heat impact polystyrene, and may conveniently be injection molded either as separate elements or as a single element connected by bridges which may be broken in order to separate the base and tray. The inwardly extending flanges 63 needed to define the slots 64 of the tray 52 may be formed using cam mold or swipe mold procedures.

The base 54 also includes a pair of outwardly biased side locks 80 disposed at end 54a. Each side lock 80 is generally aligned with one of the rails 70 and has a beveled edge 82 adjacent the forward end and a unbeveled edge 84 adjacent the rear. The base 52 also includes along each side thereof a pair of longitudinally spaced side apertures 86, each side aperture 86 being adapted to receive a side lock 80. The side apertures 86 are disposed so that one side aperture 86 on each side of the tray 52 is disposed adjacent the end 52b of the tray 52 and one side aperture 86 on each side is disposed adjacent the other end 52a. When the holder 50 is in the untelescoped configuration, the side locks 80 are disposed within the side apertures 86 adjacent the end 52b of the tray 52 and act to releasably maintain the holder 50 in the spanning configuration. On the other hand, when the holder 50 is in the telescoped configuration, the side locks 80 are disposed within the side apertures 86 adjacent the other end 52a of the tray 52.

The beveled forward edge 82 of each side lock 80 is intended to cam inwardly to permit movement of the holder 50 from the spanning configuration to the telescoped configuration. The unbeveled trailing edge 84 of each side lock 80, through its abutment with the side apertures 86 adjacent the leading end 52a is intended to preclude movement of the holder 50 from the telescoped configuration to the spanning configuration.

Tabs 180, 182 are formed on the base with an angled corner 184, 186 respectively, to help stabilize the tray 52 and base 54 in the extended position. The angled corners facilitate insertion of the base 54 into the tray. These tabs 180, 182 also protect the side locks 80 from being broken if the CD package, in jewel box form, were to be hit in the corner.

Each of the opposed sides 88, 90 of the base 54 preferably includes inwardly of the rails 70 a longitudinal upwardly biased resilient member or spacer 100 and a cut-out portion 102 surrounding each spacer 100. Each spacer 100 is secured to the upper surface of base 54 by a living hinge 101, 103, respectively, with a leading portion thereof 104 being beveled so that, as the holder 50 is being moved to its telescoped configuration, the end 52b of the tray 52 will cam the beveled portions 104 of the spacers 100 downwardly into the main plane of the base 54 to enable the holder 50 to assume the telescoped configuration.

The CD package also includes a cap generally designated 140. The cap 140 has a substantially planar body portion 142 with one end 144 adapted to face the end 52a of the tray 52, the opposed end 146 including a wall 148 for receiving a transparent window 154. Two side walls 147, 149 are also provided between ends 144, 146.

The cap 140 is preferably formed of plastic, typically a rigid or semi-rigid plastic, and may conveniently be injection molded separately or in conjunction with the holder 50, connected thereto by breakable bridges in order to permit subsequent separation.

As shown in FIG. 2, the base 54 and end cap 140 also include a waffle texture about 0.003 to 0.004 inch deep on the bottom faces 65, 141. The substantially planar body portion 142 of cap 140 is secured to section 30 of the foldable cover 10 adjacent the free end thereof, by glue 38 on the upper surface of section 30. With the prior art, planar surfaces of the cap or CD holder and cardboard cover ar merely pressed together, which causes the glue to leak out. Unfortunately, this leakage causes an unsightly package and causes a nuisance during manufacture. The waffle texture gives the glue room to go without leaking since the waffle texture creates a small space between the planar surfaces of the cap and CD holder.

Figure 8:
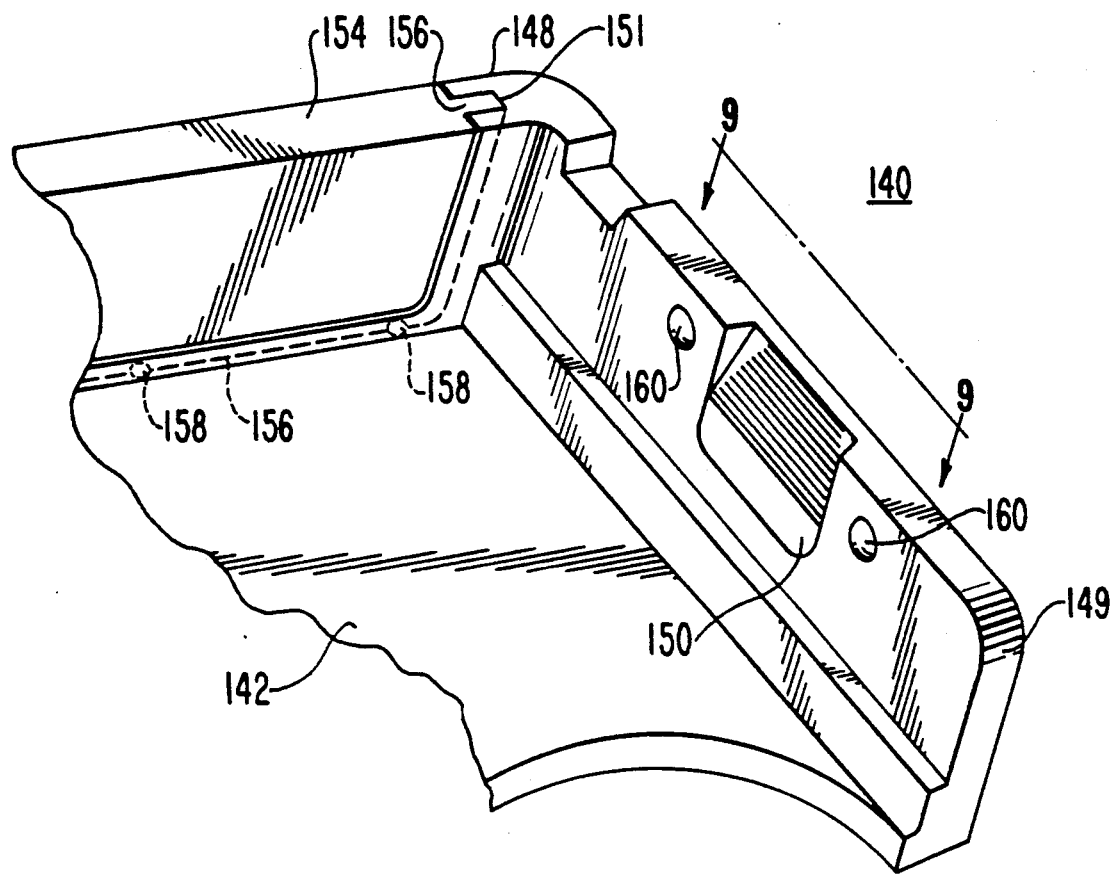
FIG. 8 is a perspective view of a corner of the end cap according to the present invention.

As shown in FIG. 8, the wall 148 and planar body 142 edges includes a continuous groove 151. The window 154 includes a corresponding rib on three sides 156. During assembly, the ribs 156 of the window 154 can be automatically mated with the groove 151, which facilitates assembly and alignment. Also, due to the cooperation of the groove 151 and rib 156, the manufacturing tolerances do not need to be as exact. Finally, energy directors 158, known in the art, are placed along the bottom of the window 154 to facilitate welding of the window 154 once aligned.

The transparent window 154 enables the prospective purchaser of the package to confirm visually prior to purchase that a CD is present in the package (e.g., by viewing the CD through the window 154 and the finger opening 62 adjacent thereto). When the package is in the storage configuration, the transparent window 154 enables a viewer to easily see the title of the CD printed on a spine or edge (e.g., a strip 28) therethrough, without the need to remove the package from the storage location.

Figure 4:
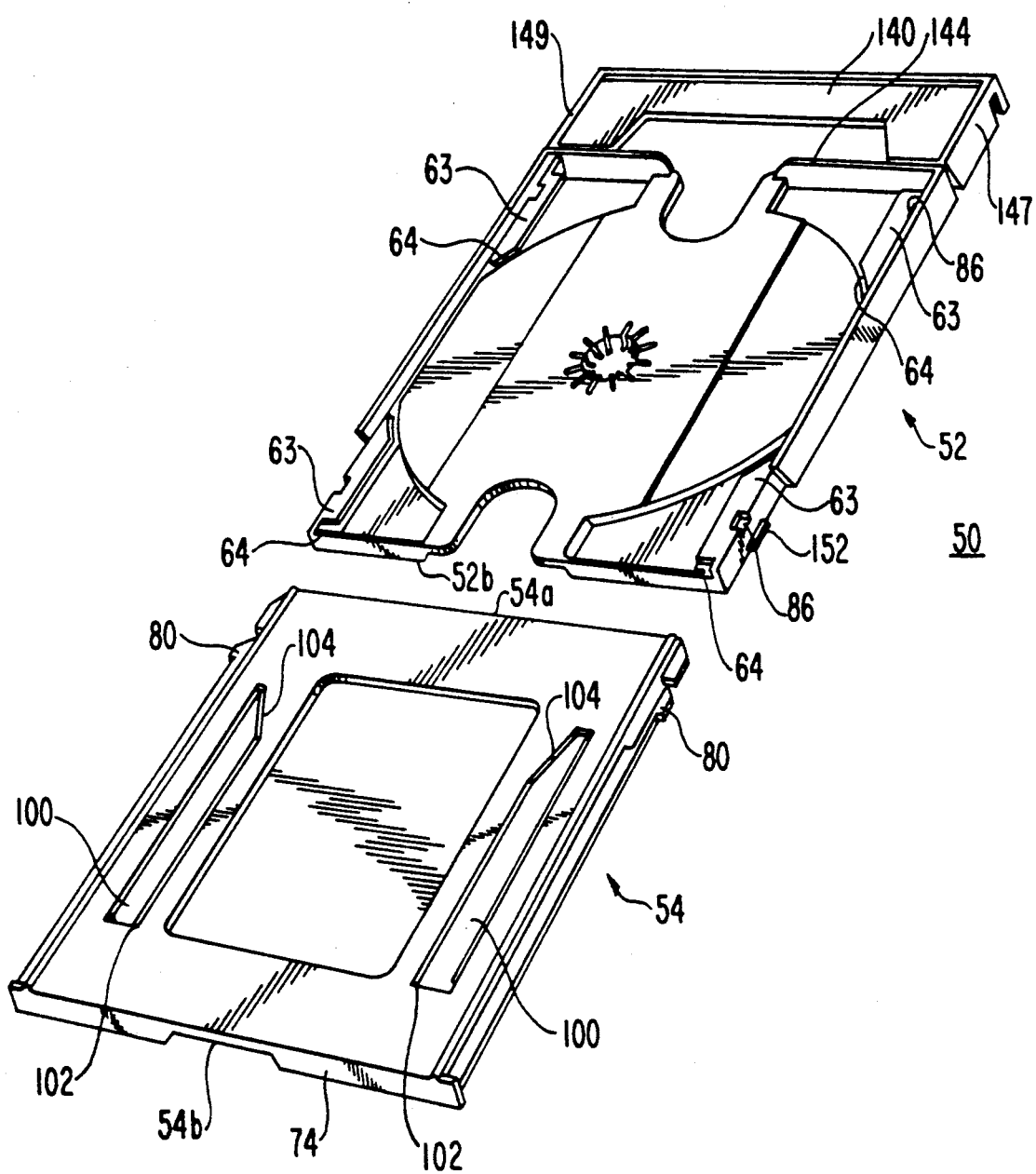
FIG. 4 is a perspective view of the bottom of the CD holder according to a second embodiment of the present invention.
Figure 5:
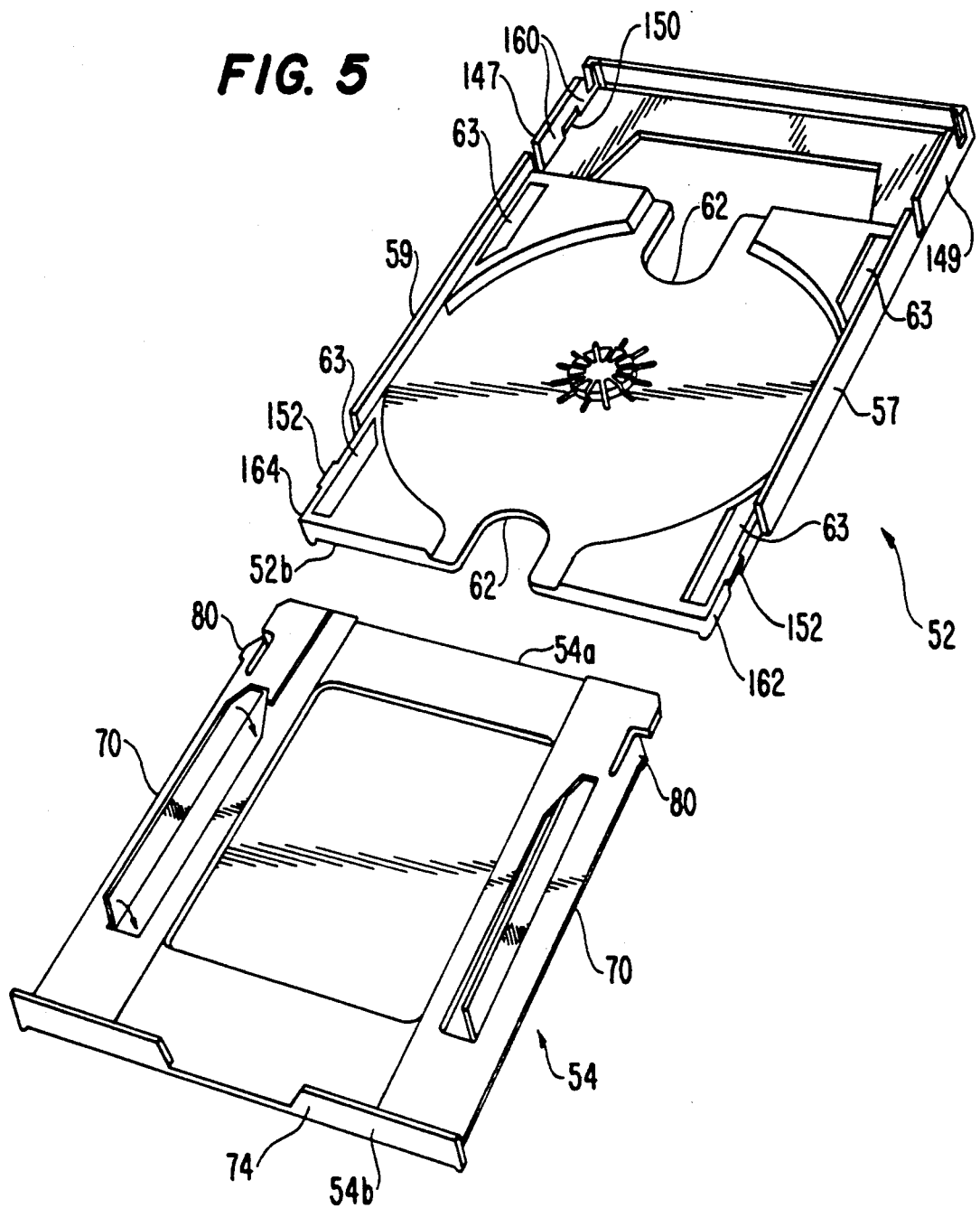
FIG. 5 is a perspective view of the top of the CD holder according to the second embodiment of the present invention.

As shown in FIGS. 4 and 5, an alternate embodiment of the CD holder 50, each of the side walls 147, 149 of the cap 140 includes a recess 150. An end 52b of tray 52 is provided with snaps or projections 152 (see FIG. 5). When the CD package is moved to the storage configuration, the walls 147, 149 of cap 140 partially cover one end and the sides of the tray 52 with the recesses 150 of cap 140 releasably engaging the projections 15 of the tray 52 by a snap action in order to releasably maintain the package in the storage configuration.

Figure 9:
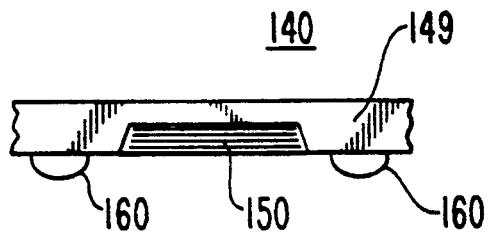
FIG. 9 is a top view of a portion of the cap taken along lines 9—9 of FIG. 8.
Figure 12:
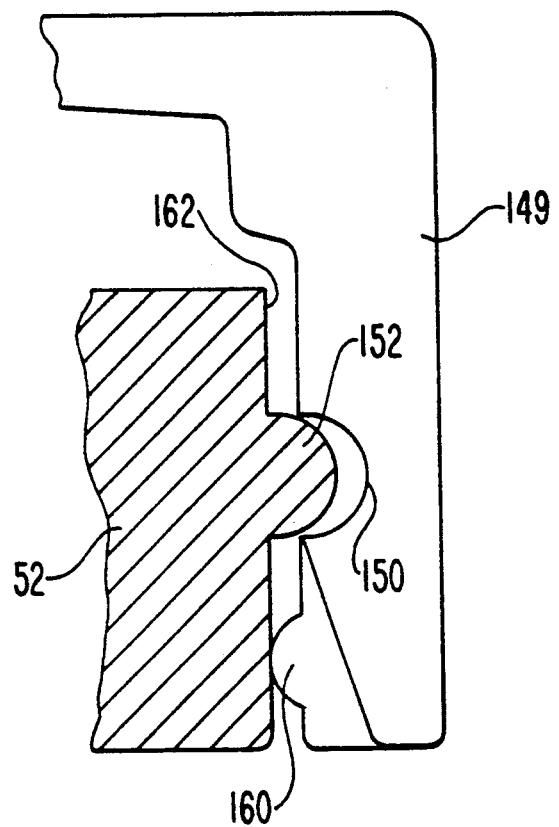
FIG. 12 is a side, cross-sectional view of a side of the end cap engaging the CD holder.

As shown best in FIGS. 8, 9 and 12, the present invention also includes the use of a pair of rounded projections 160 laterally of each recess 150 on the cap 140. These rounded projections 160 are about 0.006 inch high and maintain a constant space between the insides of the walls 147, 149 of the cap 140 and walls 162, 164 of the tray 52. These projections 160 in effect create only two points of contact between the cap 140 and tray 52 to reduce friction and facilitate connection and disconnection of the cap 140 relative to the tray 52. That is, consistent snap closing and opening is provided regardless of side pressure.

Figure 6:
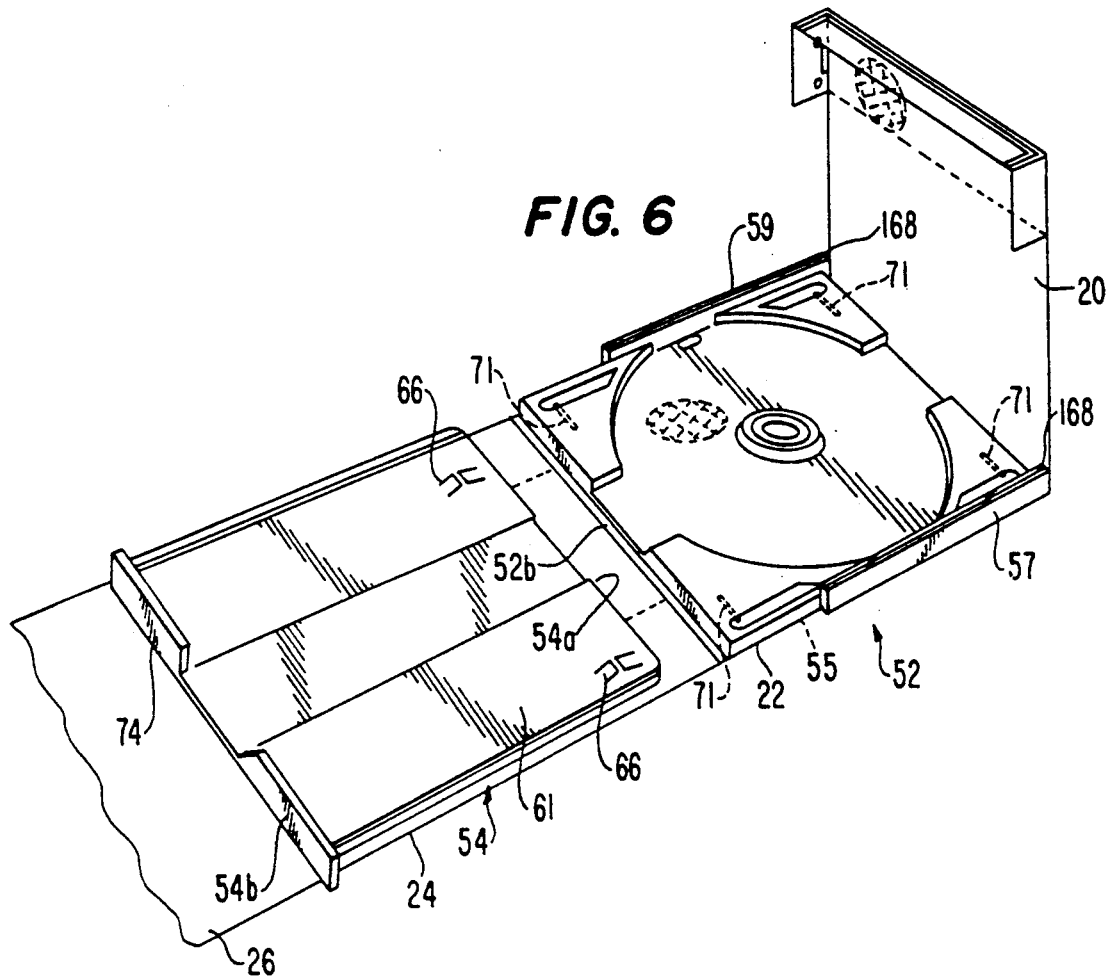
FIG. 6 is a perspective view of the top of the CD holder according to a third embodiment of the present invention.
Figure 7:
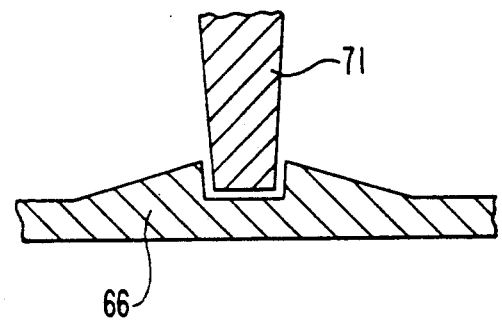
FIG. 7 is a side cross-sectional view of a projection engaging ramped stops.

As shown in FIGS. 6 and 7, which relate to a third embodiment of the CD holder, one end 54a of a front face 61 of the base 54 includes a pair of spaced opposing ramp stops 66 adapted to engage projections 71 on the bottom face 55 of the tray 52 to prevent accidental disengagement of the tray 52 from the base 54 when in either the retail or storage configurations.

An opposite end 54b of the base 54 includes a wall 74 adapted to abut the opposite end 52b of the tray 52 to provide a positive limit to the telescoping action.

The engaging interaction of the stops 66 and projections 71 limits the motion of the tray 52 relative to the base 54 in one direction as the tray 52 and base 54 are moved into the spanning configuration, and the abutting interaction of the wall 74 of the end 54b and the end 52b of the tray 52, respectively, limits motion of the tray 52 relative to the base 54 in the opposite direction, as they are moved into the telescoped configuration, thereby precluding unintended separation of the base and the tray. Thus, the holder 50 defines means precluding unintended separation of the base and the tray by limiting relative movement thereof within a plane—namely, the plane defined by the slots 64 and rails 70.

In this third embodiment, there are no side locks 80 or tabs 180, 182. Instead, the rails are solid, which facilitates tracking in the tray.

Figure 10:
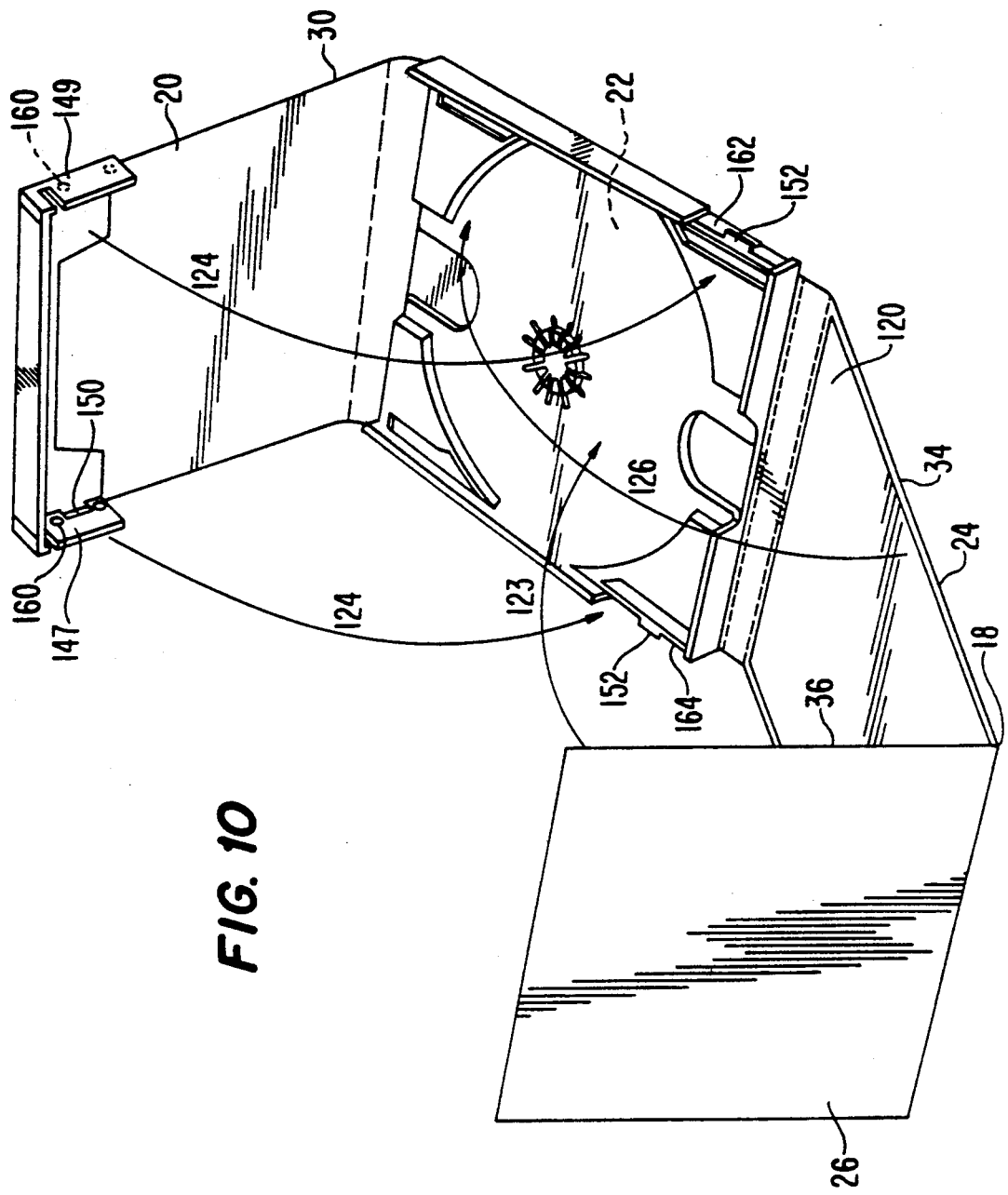
FIG. 10 is a perspective view of the cover being folded over the CD holder.
Figure 11:
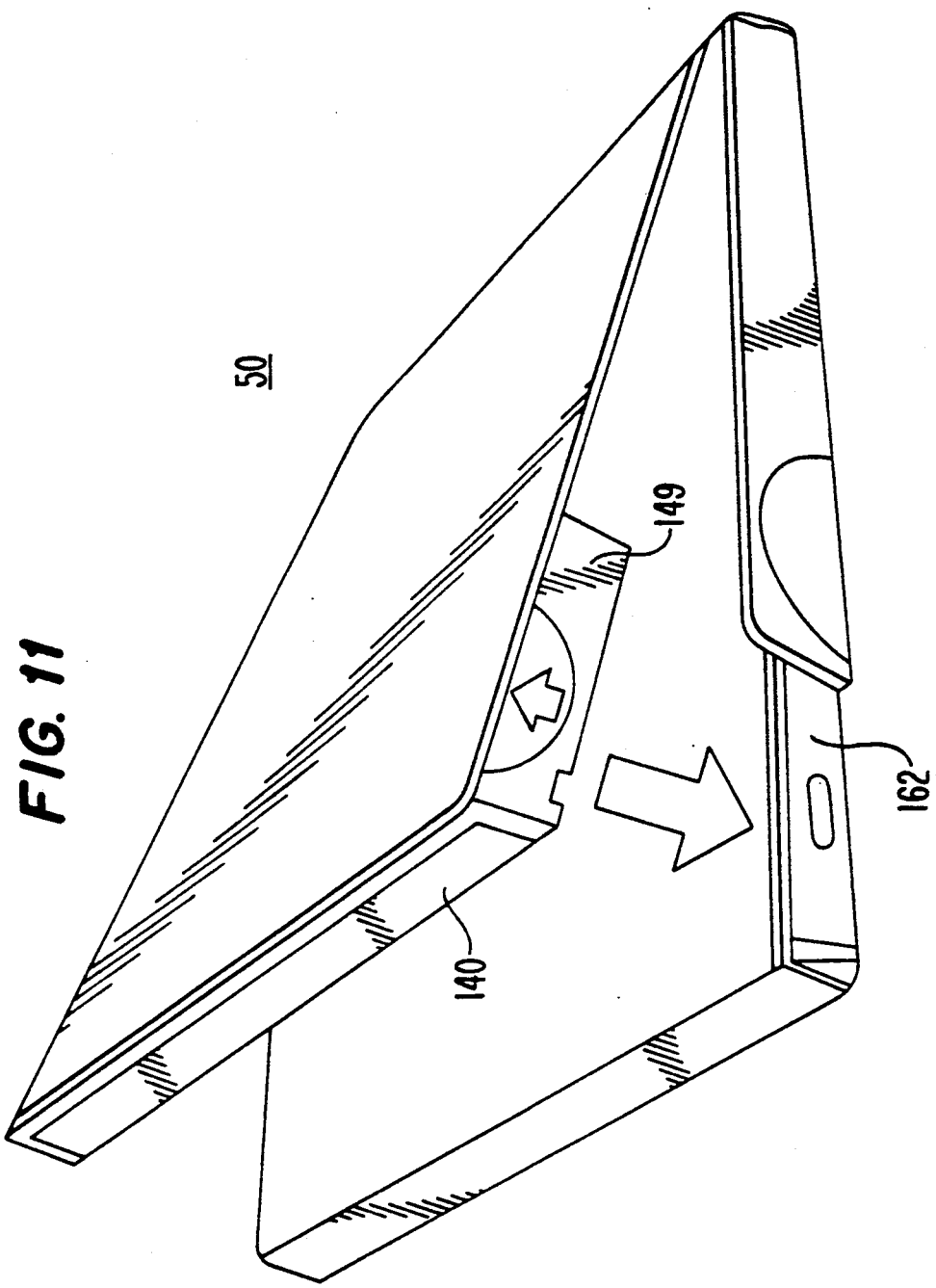
FIG. 11 is a perspective view of the end cap being engaged to the CD holder.

It is customary to include in a CD package a relatively thin booklet 120 (FIG. 10) describing the contents of the CD, its artists or the like. According to the present invention, the booklet 120 is conveniently glued or otherwise secured (either releasably or permanently) to one of the section snot covered by the base 54 or tray 52 in the spanning configuration. As illustrated in FIG. 10, the booklet 120 is secured to the upper surface of section 34 of the second row 14.

From an extended blank orientation, the package is folded along the foldlines 29 and bordering strips 28, intermediate section 22 and section 24 to assume a retail configuration. The result is a generally parallelipiped configuration which, when overwrapped in conventional fashion with a heat-shrunk outerwrap (not shown), is relatively rigid and resists folding into a more compact configuration until the overwrap is removed, the package unfolded, and the holder moved to the telescoped configuration.

It will be appreciated that the natural resistance of the paperboard to compression, supplemented by the rigidity imparted thereto by a tightly heat-shrunk overwrapping, strongly resists any forcible attempt to move the holder 50 to its telescoped configuration prior to opening of the package. Folding of the package in half along foldlines 29 is prevented by the presence therein of the holder 50 in its spanning configuration, as illustrated e.g. in FIG. 2.

When the package has been purchased and the overwrap removed, the package may be returned generally to the extended blank orientation illustrated in FIG. 10, and then the tray 52 slid onto the base 54, in order to cause the holder 50 to assume its telescoped configuration. The segment comprised of sections 26, 36 is next folded in the direction of arrow 123 about foldline 18 to cover the booklet 120 and the segment comprised of sections 24, 34. Then, the portion of the package (consisting of sections 24, 34, booklet 120, and sections 36, 26) is rotated in the direction of arrow 126 to overlie the collapsed holder 50 and section 22 therebelow. Finally, the segment comprised of sections 20, 30 is rotated in the direction of arrow 124 in order to overlie the other sections and put the package in the collapsed home orientation.

Figure 13:
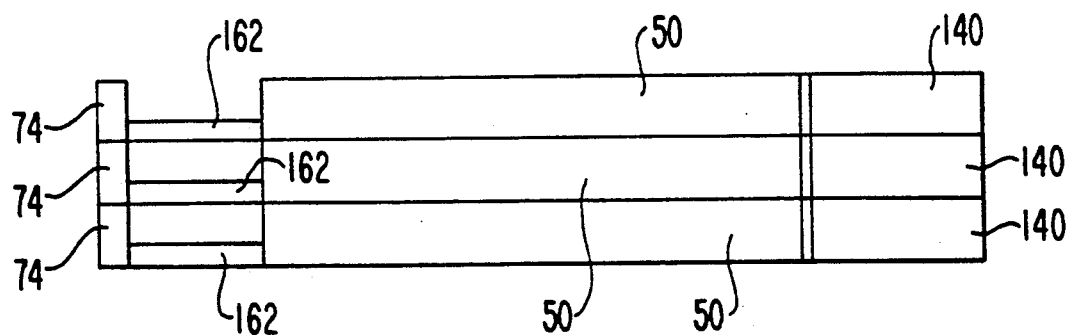
FIG. 13 is a side view of a plurality of stacked CD holders according to the present invention.
Figure 14:
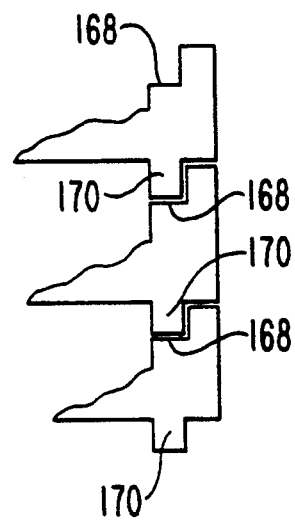
FIG. 14 is a cross-sectional view of the side walls of the stacked CD holders.
Figure 15:
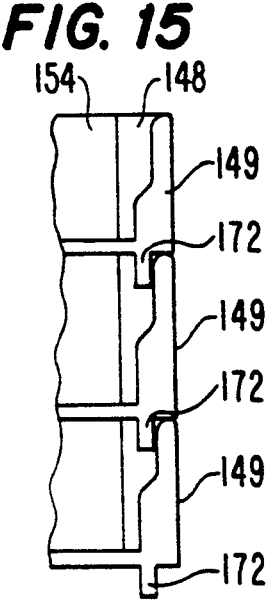
FIG. 15 is a cross-sectional view of the side walls of stacked end caps.

As shown in FIGS. 13-15 along the upper edges of the walls 57, 59, there is formed a linear channel 168. Along the lower edges of the walls 57, 59, there is formed a corresponding linear projection 170. Also, along the lower edge of the cap 140, corresponding to but inset from, walls 147, 148 and 149, there is formed a linear projection 172. The linear projections 170, 172 formed on the tray walls 57, 59 and on the cap 140 are received by the channel 168 formed along the upper edges of the walls 57, 59 and within the walls 147, 148, 149 and window 154, respectively. This allows the CD holder 50 with cap 140 molded thereon to easily nest or stack. This stacking facilitates automated assembly, shipping and storage.

The foregoing is considered as illustrative only of the principles of the present invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention in the appended claims.

What is claimed is:

1. A CD package including a CD holder having a base in telescoping relationship with a tray having side walls, wherein the tray and base can be moved from a first telescoped configuration to a second untelescoped configuration, and a foldable cover, said CD holder being affixed to the foldable cover, comprising:

means for temporarily locking the base and tray in the first telescoped configuration, and a cap affixed to the cover and being engageable with the tray, said cap including two side walls, each side wall having a recess formed thereon and a rounded projection formed on each side of the recess, each of said recesses being engageable with a corresponding projection formed on the tray, wherein said rounded projections on the cap create a two point low friction contact surface between the cap side walls and tray side walls.

2. The CD package as recited in claim 1, wherein a bottom portion of the cap and a bottom portion of the base include a waffle texture to improve affixation of the cap and base to the cover via adhesive.

3. The CD package as recited in claim 1,
wherein the tray includes side walls having linear recesses on the top thereof and corresponding linear projections along the bottom thereof, and
wherein a plurality of trays can be nested together by cooperating with the linear recesses and projections.

4. The CD package as recited in claim 3, further comprising a cap molded together with the tray via break points.

5. The CD package as recited in claim 4, wherein the cap includes two side walls, an end wall and a linear projection on an underside thereof, said linear projection being received within and abutting the two side walls and end wall of another cap so that a plurality of caps can be nested together.

6. The CD package as recited in claim 1, further comprising:
a tab located on each side of the base for abutting the sides of the tray and stabilizing the base relative to the tray.

7. A CD package including a CD holder having a base in telescoping relationship with a tray, wherein the tray and base can be moved from a first telescoped configuration to a second untelescoped configuration, and a foldable cover, said CD holder at the base being affixed by glue to the foldable cover, comprising:
means for temporarily locking the base and tray in the first telescoped configuration; and
a cap affixed by glue to the cover and being engageable with the tray,
wherein a bottom portion of the cap and a bottom portion of the base include a waffle texture to prevent glue leakage from between the cap and the cover, and the base and the cover.

8. The CD package as recited in claim 7,
wherein the tray includes side walls having linear recesses on the top thereof and corresponding linear projections along the bottom thereof, and
wherein a plurality of trays can be nested together by cooperating the linear recesses and projections.

9. A CD package comprising a CD holder affixed to a foldable cover, comprising:
a cap affixed to the cover and being engageable with the CD holder, said cap including two side walls, each side wall having a recess formed thereon and a rounded projection formed on each side of the recess, each of said recesses being engageable with a projection formed on side walls of the CD holder,
wherein said rounded projections on the cap create a two point low friction contact surface between the cap side walls and the CD holder side walls.

10. The CD package as recited in claim 9,
wherein a bottom portion of the cap and a bottom portion of the CD holder include a waffle texture to improve affixation of the cap and CD holder to the cover via adhesive.

11. The CD package as recited in claim 9,
wherein the CD holder includes side walls having linear recesses on the top thereof and corresponding linear projections along the bottom thereof, and
wherein a plurality of CD holders can be nested together by cooperating the linear recesses and projections.

12. A CD package including a CD holder affixed by glue to a foldable cover, comprising:
a cap affixed by glue to the cover and being engageable with the CD holder,
wherein a bottom portion of the cap and a bottom portion of the CD holder each include a waffle texture to prevent glue leakage from between the cap and the cover, and the CD holder and the cover.

13. The CD package as recited in claim 12,
wherein the CD holder includes side walls having linear recesses on the top thereof and corresponding linear projections along the bottom thereof, and
wherein a plurality of CD holders can be nested together by cooperating the linear recesses and projections.

* * * * *